(12) United States Patent
Kim

(10) Patent No.: US 12,489,311 B2
(45) Date of Patent: Dec. 2, 2025

(54) STANDBY POWER CUT-OFF DEVICE

(71) Applicant: Byongho Kim, Busan (KR)

(72) Inventor: Byongho Kim, Busan (KR)

( * ) Notice: Subject to any disclaimer, the term of this patent is extended or adjusted under 35 U.S.C. 154(b) by 0 days.

(21) Appl. No.: 18/729,453

(22) PCT Filed: Nov. 29, 2022

(86) PCT No.: PCT/KR2022/019036
§ 371 (c)(1),
(2) Date: Jul. 16, 2024

(87) PCT Pub. No.: WO2023/136466
PCT Pub. Date: Jul. 20, 2023

(65) Prior Publication Data
US 2025/0096591 A1    Mar. 20, 2025

(30) Foreign Application Priority Data

Jan. 17, 2022 (KR) .................. 10-2022-0006775
Nov. 28, 2022 (KR) .................. 10-2022-0161572

(51) Int. Cl.
*H02J 9/00* (2006.01)
*G01R 19/00* (2006.01)
(Continued)

(52) U.S. Cl.
CPC .............. *H02J 9/005* (2013.01); *H02J 7/345* (2013.01); *H02J 50/001* (2020.01); *G01R 19/0084* (2013.01); *H02J 2207/50* (2020.01)

(58) Field of Classification Search
CPC ... H02J 9/00; H02J 50/001; H02J 7/00; G01R 19/00
See application file for complete search history.

(56) References Cited

U.S. PATENT DOCUMENTS 9,143,006 B2 * 9/2015 Lee .................. H02J 9/005
9,761,130 B2 * 9/2017 Kim .................. H02J 3/00
(Continued)

FOREIGN PATENT DOCUMENTS

EP   2 757 656 A2   7/2014
KR   10-1091772 B1  12/2011
(Continued)

OTHER PUBLICATIONS

KR First Office Action dated Jan. 25, 2023 as received in Application No. 10-2022-0161572.
(Continued)

*Primary Examiner* — Rexford N Barnie
*Assistant Examiner* — Joseph N Inge
(74) *Attorney, Agent, or Firm* — Maschoff Brennan

(57) ABSTRACT

A standby power cut-off device installed on a power line connecting an external commercial alternating current power and the inside of an electrical device comprises: a manual switch for supplying the commercial alternating current power or cutting off the supply of same; a solid-state relay for supplying the commercial alternating current power to an output side when current flows through an input side according to the operation of the manual switch; a low power supply unit for converting voltage of the commercial alternating current power supplied by the solid-state relay and supplying same; a microprocessor for receiving power from the low power supply unit and controlling the operation of the standby power cut-off device; and a power storage unit.

11 Claims, 5 Drawing Sheets

(51) Int. Cl.
  *H02J 7/34* (2006.01)
  *H02J 50/00* (2016.01)

(56) References Cited

U.S. PATENT DOCUMENTS

| | | | | |
|---|---|---|---|---|
| 2009/0021077 | A1* | 1/2009 | Zilberberg | H02J 9/065 |
| | | | | 307/66 |
| 2011/0037324 | A1* | 2/2011 | Perper | H02J 7/00 |
| | | | | 307/140 |
| 2011/0121656 | A1* | 5/2011 | Hicks | H02J 1/00 |
| | | | | 307/80 |
| 2011/0127854 | A1* | 6/2011 | Cruz | H01H 9/54 |
| | | | | 307/131 |
| 2012/0201062 | A1* | 8/2012 | Lee | H02J 9/005 |
| | | | | 398/115 |
| 2019/0027880 | A1* | 1/2019 | Kim | H02J 9/005 |
| 2024/0380229 | A1* | 11/2024 | Kim | H02J 7/0068 |

FOREIGN PATENT DOCUMENTS

| | | |
|---|---|---|
| KR | 10-2012-0093709 A | 8/2012 |
| KR | 10-2013-0121046 A | 11/2013 |
| KR | 10-1362207 B1 | 2/2014 |
| KR | 10-2220760 B1 | 2/2021 |

OTHER PUBLICATIONS

KR Second Office Action dated May 24, 2023 as received in Application No. 10-2022-0161572.
KR Decision to Grant Dated Sep. 18, 2023 as received in Application No. 10-2022-0161572.

\* cited by examiner

STANDBY POWER CUT-OFF DEVICE

TECHNICAL FIELD

The present invention relates to a standby power cut-off device that is capable of being installed on the inside or outside of an electrical device to have no risk of malfunctions due to multiple operations of a microprocessor if the electrical device is turned on and off by means of a manual switch, to allow commercial alternating current power to be cut off if the electrical device is turned off, and to allow at least power stored in an energy storage unit to be used as networked standby power required for internet of things devices.

BACKGROUND ART

Standby power is considered as a problem in a standby mode of an electrical device, and further, networked standby power of an internet of things device is considered as a big problem in a networked standby mode of the internet of things device. In the standby mode of the electrical device, besides, a power factor is substantially low, and therefore, solutions to reduce energy consumption in a networked standby mode of the electrical device have been requested worldwide.

According to a conventional technology as disclosed in Korean Patent No. 10-1494822, if a power switch is pressed, a photo triac and a photo coupler are turned on in a forward direction, AC power is supplied to a power unit, and the power unit supplies the power to a control unit (microprocessor), so that a relay is operated by the control unit to allow the power to be consistently supplied to the power unit and the control unit. Once if the power is consistently supplied to the control unit, an electronic product is normally operated, even without any pressing against the power switch. While the power switch is being pressed, however, current flows to the photo coupler and then does not flow thereto, which are repeated. If the power switch is pressed for one second at the frequency of 60 Hz, the number of operations of repeatedly flowing the current and cutting off the flow of the current is 60, and therefore, the control unit (microprocessor) receives a plurality of control signals so that it may be malfunctioned due to multiple operations thereof. Further, there is no energy storage unit (e.g., a battery, a supercapacitor, or the like), and therefore, it is impossible that the conventional technology is adopted for internet of things devices.

In the specification, further, electrical devices include all types of devices to which a standby power cut-off device is adopted, such as internet of things devices, wireless remote controlled electronic devices controlled by remote controllers, other electronic devices except the wireless remote controlled electronic devices, and various types of electrical devices, and the like.

DISCLOSURE OF THE INVENTION

Technical Problems

It is an object of the present invention to provide a standby power cut-off device that is capable of being installed on the inside or outside of an electrical device to have no risk of malfunctions due to multiple operations unexpected if a manual switch is operated in a state where commercial alternating current power is cut off, while turning on and off the electrical device safely, so that if the electrical device is turned off, the commercial alternating current power is cut off, and capable of allowing at least power required as networked power of internet of things devices to be charged to an energy storage unit such as a supercapacitor, thereby enabling the internet of things devices to perform communication.

Technical Solutions

To accomplish the above-mentioned objects, according to the present invention, there is provided a standby power cut-off device installed on a power line connecting an external commercial alternating current power and the inside of an electrical device, the standby power cut-off device including: a manual switch for supplying the commercial alternating current power or cutting off the supply; a solid-state relay for supplying the commercial alternating current power to an output side thereof if current flows to an input side thereof according to the operation of the manual switch; a low power supply unit for converting a voltage of the commercial alternating current power supplied by the solid-state relay and supplying the converted voltage; a microprocessor receiving the power from the low power supply unit and controlling operations of the standby power cut-off device; a power storage unit charged with the power received from the low power supply unit and supplying the power to the microprocessor; and a control signal generator for transmitting a control signal to the microprocessor if the current flows according to the operation of the manual switch, wherein the microprocessor performs the operation control of turning on or off by using a control method of comprising: a first step of repeatedly determining whether the control signal of the control signal generator does not exist if the manual switch is operated; a step of determining whether a given period of time passes after the first step has been performed; and a second step of determining whether the control signal exists, and if it is determined that the control signal does not exist, the microprocessor determines that the operation of the manual switch is finally stopped.

Advantageous Effects of the Invention

According to the present invention, the standby power cut-off device is installed on the inside or outside of the electrical device to have no risk of multiple operations unexpected if the manual switch is operated in a state where the commercial alternating current power is cut off, while turning on and off the electrical device safely, without having any heat or spark, so that if the electrical device is turned off, the commercial alternating current power is cut off, thereby preventing electrical energy from being consumed unnecessarily due to standby power.

According to the present invention, further, the standby power cut-off device is configured to allow at least power required for the networks of the internet of things devices to be charged to the storage unit such as a supercapacitor, while cutting off the commercial alternating current power if the electrical device is turned off, thereby preventing electrical energy from being consumed unnecessarily due to reactive power as well as active power in a standby mode.

MODE FOR INVENTION

Hereinafter, embodiments according to the present invention will be described with reference to the accompanying drawings, and in explaining the embodiments, detailed description on known elements or functions will be omitted if it is determined that such description will interfere with understanding of the embodiments. Further, the terms as will be discussed later are defined in accordance with the functions of the present invention, but may be varied under the intention or regulation of a user or operator. Therefore, they should be defined on the basis of the whole scope of the present invention.

Figure 1:
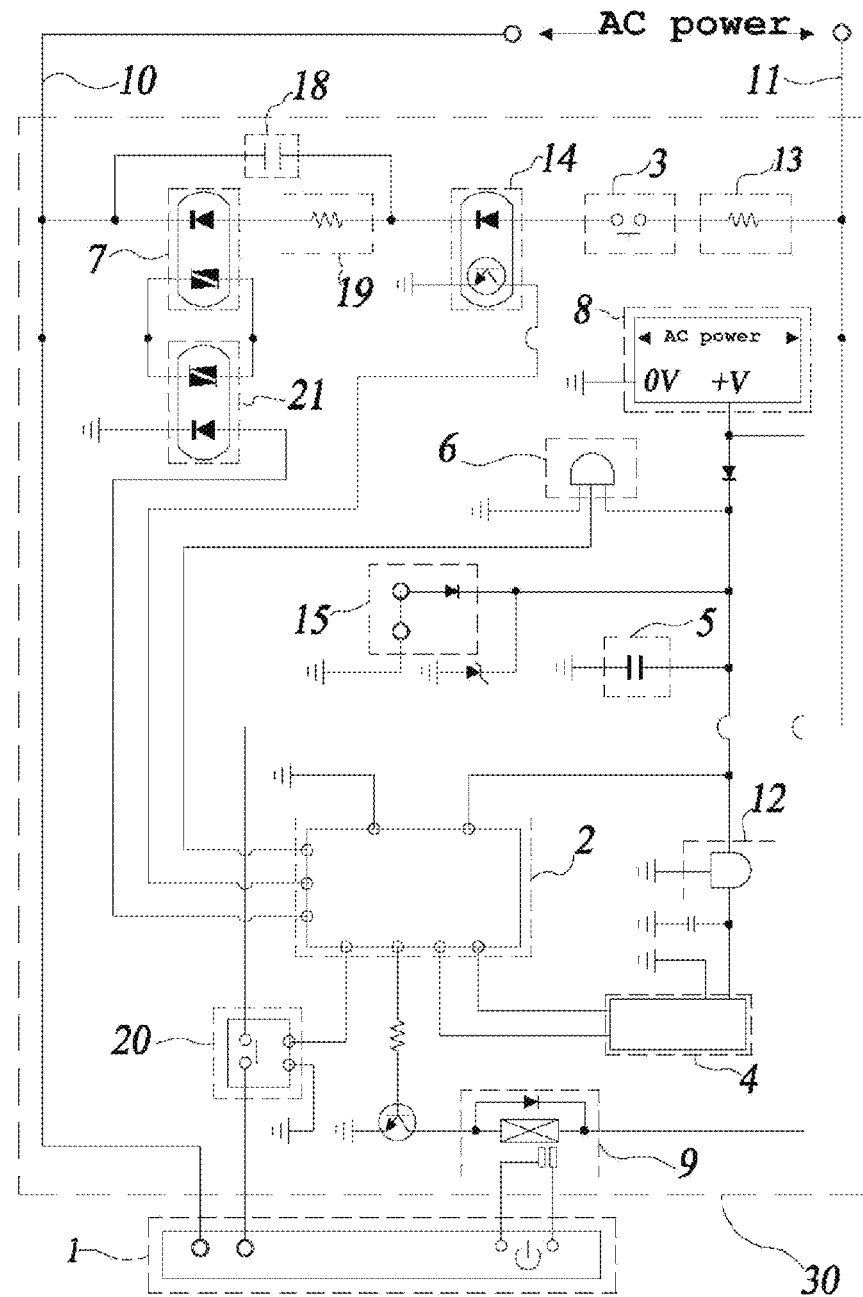
FIG. 1 is a circuit diagram showing a standby power cut-off device according to a first embodiment of the present invention.

FIG. 1 shows a standby power cut-off device 30 according to a first embodiment of the present invention that is located outside an electrical device 1, but only if the standby power cut-off device 30 is located on a power line connected to the inside of the electrical device 1, of course, it is possible that the standby power cut-off device 30 is located inside the electrical device 1. More desirably, the standby power cut-off device 30 is located on a power cable and a power switch that enter a power supply unit of the electrical device 1. Further, the standby power cut-off device 30 itself may be an electrical device such as a power outlet, a power strip, a hub, a relay, a plug, an adapter, and the like.

In the first embodiment of the present invention, as shown in FIG. 1, one power line 11 of two power lines 10 and 11 is cut by means of a main power switch 20, and the other line 10 is connected, without any cut. However, it is obvious to a person skilled in the art that the two power lines 10 and 11 may be cut by means of the main power switch 20. Further, single-phase power is suggested as power in the description, but it is obvious to a person skilled in the art that three-phase power may be suggested as power.

In the description, the standby power cut-off device 30 is referred to simply as the cut-off device 30.

A microprocessor 2 according to the embodiment of the present invention performs operations, analysis, comparison, time control, detection, determination, high-frequency generation, and the like and controls the whole operations and functions of the cut-off device 30. Further, the microprocessor 2 may be a general-purpose MPU and a single semiconductor device having a function of a CPU, such as an MCU, a RISC processor, a DSP, and the like.

The cut-off device 30 includes a control signal generator 14 for transmitting a control signal to the microprocessor 2 if a current flows according to the operation of a manual switch 3. The control signal generator 14 is a photo coupler, a photo (MOS) FET, a lead switch, a relay, or the like. In this case, the photo coupler is a general composite photosensor that optically couples a light-emitting diode and a light-receiving diode to transmit electrical signals between the two diodes electrically insulated from each other, and the photo coupler includes a photo transistor, a photo triac, etc.

A low power supply unit 8 according to the embodiment of the present invention converts commercial alternating current power supplied by a solid-state relay 7 into direct current power as necessary and supplies the power to the microprocessor 2 and parts where the power is needed. The low power supply unit 8 uses a transforming method and a switching method. For example, the low power supply unit 8 may be a circuit having a rectifier diode connected to both terminals of any one among a plurality of capacitors connected in series, a circuit having a rectifier diode connected to both terminals of a voltage regulator in a circuit with which the voltage regulator having a capacitor, a resistor, and a diode is connected in series, a switched-mode power supply (SMPS), or an AC-DC converter.

The solid-state relay 7 according to the embodiment of the present invention as an on/off control device is an alternating current conduction and output switch using one or more semiconductors that separates an input side and an output side from each other. The solid-state relay 7 is classified into a hybrid SSR, a transformer-coupled SSR, and a photo-coupled SSR as input circuits, when a method for separating the input side and the output side is considered. The hybrid SSR, which is a solid-state relay to which a lead relay is coupled, applies a control signal to a coil of the lead relay to activate a trigger circuit for operating a bidirectional thyristor (triac) so that the relay is used as a switch. The transformer-coupled SSR, which is a solid-state relay to which a transformer is coupled, applies a control signal to a small low power transformer to operate a bidirectional thyristor using a secondary voltage generated through primary excitation. The photo-coupled SSR applies a control signal to, for example, a general light-emitting diode (LED) so that a bidirectional thyristor as a photosensitive semiconductor is turned on by the radiant rays generated from the LED and transfers alternating current. For example, the photo-coupled SSR is a photo triac coupler, a bidirectional photo (MOS) FET, or the like. In this case, the photo triac coupler is a general composite photosensor that optically couples a light-emitting diode and a light-receiving diode to transmit electrical signals between the two diodes electrically insulated from each other, and if necessary, the photo triac coupler may be replaced with a photo transistor, a photo Darlington, a photo logic-IC, a photo coupler, a photo SCR, or a photo FED, which has the same function as one another. Otherwise, the photo-coupled SSR applies a voltage to the light-emitting diode so that a photo transistor coupled optically to the light-emitting diode is turned on and a zero crossing circuit operates to allow a triac to be turned on around a zero voltage of alternating current power, thereby transferring alternating current.

The manual switch 3 according to the embodiment of the present invention is a non-lock switch whose contact points are connected only when it is operated. Desirably, the manual switch 3 is a tact switch. An operation of the manual switch 3 allows contact points to be connected according to a pressing, pulling or pushing operation of the switch so that the switch is turned on. Stop operating the manual switch 3 means that the contact points of the switch are separated so that the switch is turned off.

The cut-off device 30 further includes a current-limiting resistor 13 and a diode 22 that are connected in series with the manual switch 3 to reduce the current of the commercial alternating current power. The current-limiting resistor 13 and the diode 22 serve to limit and divide the current of the commercial alternating current power to protect the manual switch 3, the control signal generator 14, and the solid-state relay 7 from excessive burning. Further, the diode 22 may be a constant voltage diode, a bridge diode, or the like.

Figure 3:
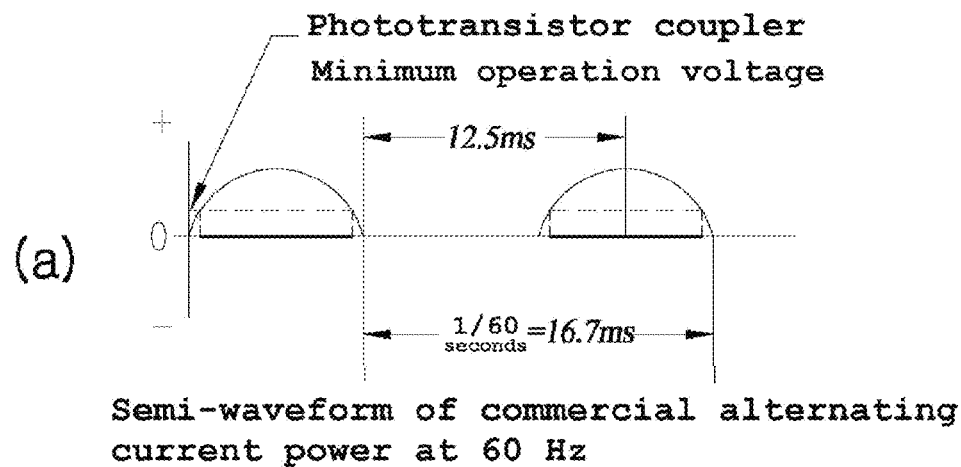
FIG. 3 is a flowchart showing first and second control according to a semi-waveform of commercial alternating current power and an operation of a manual switch.
Figure 3:
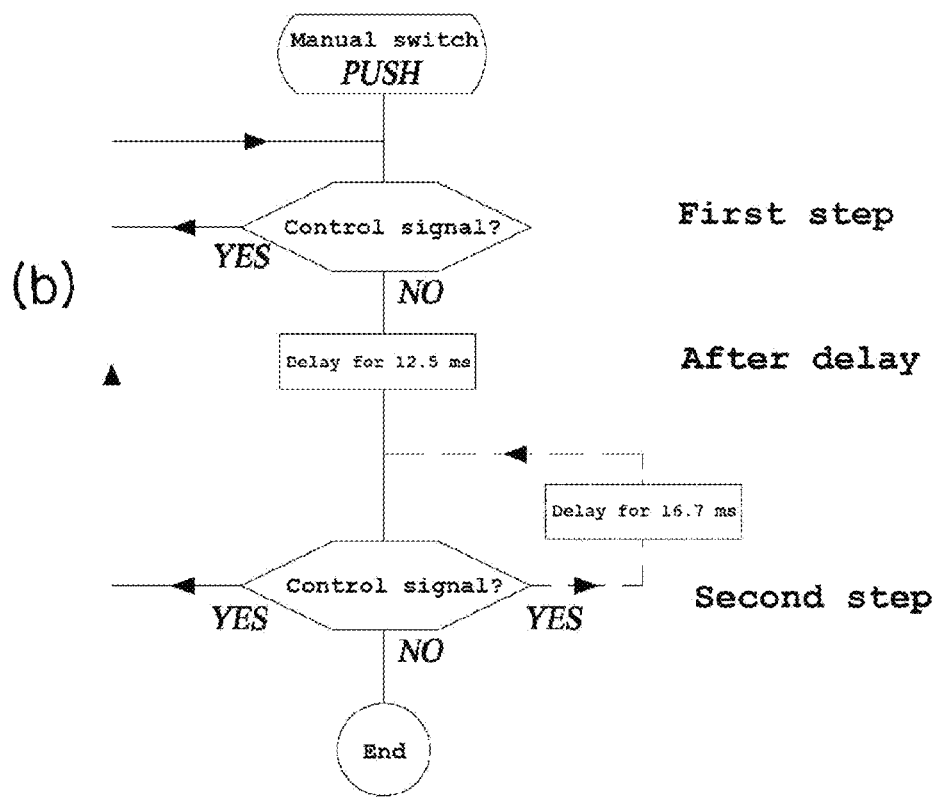

Referring to FIGS. 3a and 3b, if the manual switch 3 is operated, the current is reduced by means of the current-limiting resistor 13, and accordingly, in the case where the control signal generator 14 is a photo transistor coupler, the current flows only in a forward direction. The current does not flow in a reverse direction. If the manual switch 3 is operated for 0.5 to 1.5 seconds at a frequency of 60 Hz by means of a user, the current flows to the control signal generator 14 and then does not flow thereto, which are repeated 30 to 90 times. As the current flows and then does not flow to the control signal generator 14 repeatedly, the microprocessor 2 recognizes that the control signal generator 14 transmits a plurality of control signals and thus performs multi-operation control. The plurality of control signals are generated by one-time operation of the manual switch 3, but in this case, the microprocessor 2 desirably must perform one-time operation control.

To do this, the microprocessor 2 performs the operation control of turning on or off by using a control method including a first step of repeatedly determining whether the control signal generated from the control signal generator 14 does not exist if the manual switch 3 is operated to generate the control signal from the control signal generator 14, a step of determining whether a given period of time passes if it is determined that the control signal does not exist in the first step, and a second step of determining whether the control signal does not exist, so that if it is determined that the control signal does not exist, it is determined that the operation of the manual switch 3 is finally stopped, thereby preventing occurrence of the malfunctions caused by the multi-operation control according to the plurality of control signals of the control signal generator.

In more detail, the above method is as follows. For the convenience of the description, the control signal generator 14 is a photo transistor coupler. If the switch is pressed and operated, a transistor is operated by the light emission of a light emitting diode (LED) of the photo transistor coupler so that the input of the microprocessor is in a low state from a high state, thereby detecting the operation of the switch and the stop operating the switch.

Referring to FIG. 3b, a first control method according to the operation of the manual switch 3 is as follows. In the first control method, the first step is performed if the manual switch is operated, and if the given period of time passes after the first step has been performed, the second step is performed so that if the control signal exists, the microprocessor 2 returns to the first step, and if the control signal does not exist, the microprocessor 2 determines that the operation of the manual switch is finally stopped.

Further, the given period of time may decrease or increase because the frequency of the commercial alternating current power that is always varied due to mechanical causes or load changes of a power generator, and therefore, the given period of time is determined to prevent the second step from being performed around a minimum operation voltage of the photo transistor coupler 14. Accordingly, the given period of time is desirably 12.5 ms, as shown in FIG. 3a, even if it may be varied according to the operation voltage characteristics of the photo transistor coupler 14.

Referring to FIG. 3b, a second control method according to the operation of the manual switch 3 is as follows. In the second control method, the first step is performed if the manual switch is operated, and if the given period of time passes after the first step has been performed, the second step is performed so that if the control signal exists, the microprocessor 2 performs the second step whenever a predetermined period of time passes, and if the control signal does not exist, the microprocessor 2 determines that the operation of the manual switch is finally stopped.

If the control signal exists in the second step, the microprocessor 2 returns to the first step, but in the second control method, the second step is performed whenever the predetermined period of time passes. The predetermined period of time is desirably one second of 60 minutes at a frequency of 60 Hz and one second of 50 minutes at a frequency of 50 Hz, which are periods of time of the frequencies of the commercial alternating current power.

Figure 4:
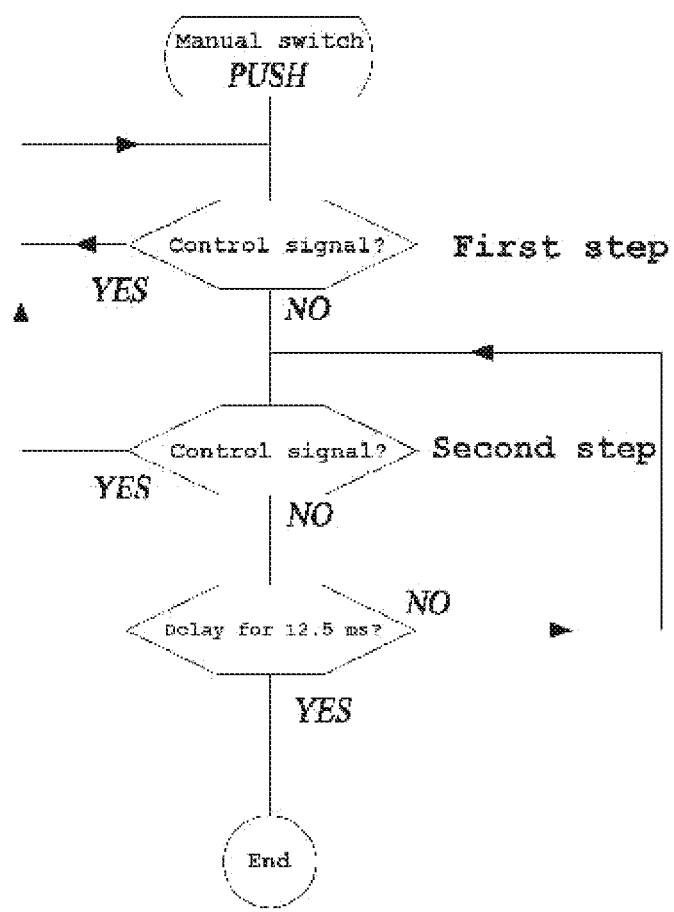
FIG. 4 is a flowchart showing third control according to the operation of the manual switch.

Referring to FIG. 4, a third control method according to the operation of the manual switch 3 is as follows.

In the third control method, the first step is performed if the manual switch 3 is operated, and the second step is performed during the given period of time after the first step has been performed, so that if the given period of time passes, without having the control signal, the microprocessor 2 determines that the operation of the manual switch is finally stopped. Of course, if the control signal exists in the second step, the microprocessor 2 returns to the first step. Further, the given period of time is desirably 12.5 ms.

If the electrical device 1 is turned off, the microprocessor 2 turns on the cut-off device through the above-mentioned control method, and contrarily, if the electrical device 1 is turned on, the microprocessor 2 turns off the cut-off device through the above-mentioned control method.

The cut-off device further includes a power storage unit 5 that is charged with the power received from the low power supply unit 8 and supplies the power to the microprocessor 2. The power storage unit 5 supplies the power to the microprocessor 2 or a wireless receiver 4 in a state where the commercial alternating current power is cut off, and the power storage unit 5 is a battery, a supercapacitor, a hybrid battery ultracapacitor (with graphene), a high-capacity capacitor, or the like.

If the solid-state relay 7 as shown in FIG. 1 is a photo triac having a zero crossing circuit, the current at the input side thereof flows only in a forward direction, so that it is impossible to use the photo triac. Therefore, it is possible to use the photo triac if the current at the input side thereof can flow in a reverse direction.

Accordingly, the cut-off device 30 further includes a capacitor 18 that is charged and then discharged according to the operation of the manual switch 3 to allow the current to flow even when the current of the solid-state relay 7 is not in the forward direction according to the operation of the manual switch 3 and a resistor 19 connected in series with the capacitor 18. The resistor 19 serves to allow a charged voltage of the capacitor 18 to be higher than an operation voltage of the solid-state relay 7.

Figure 2:
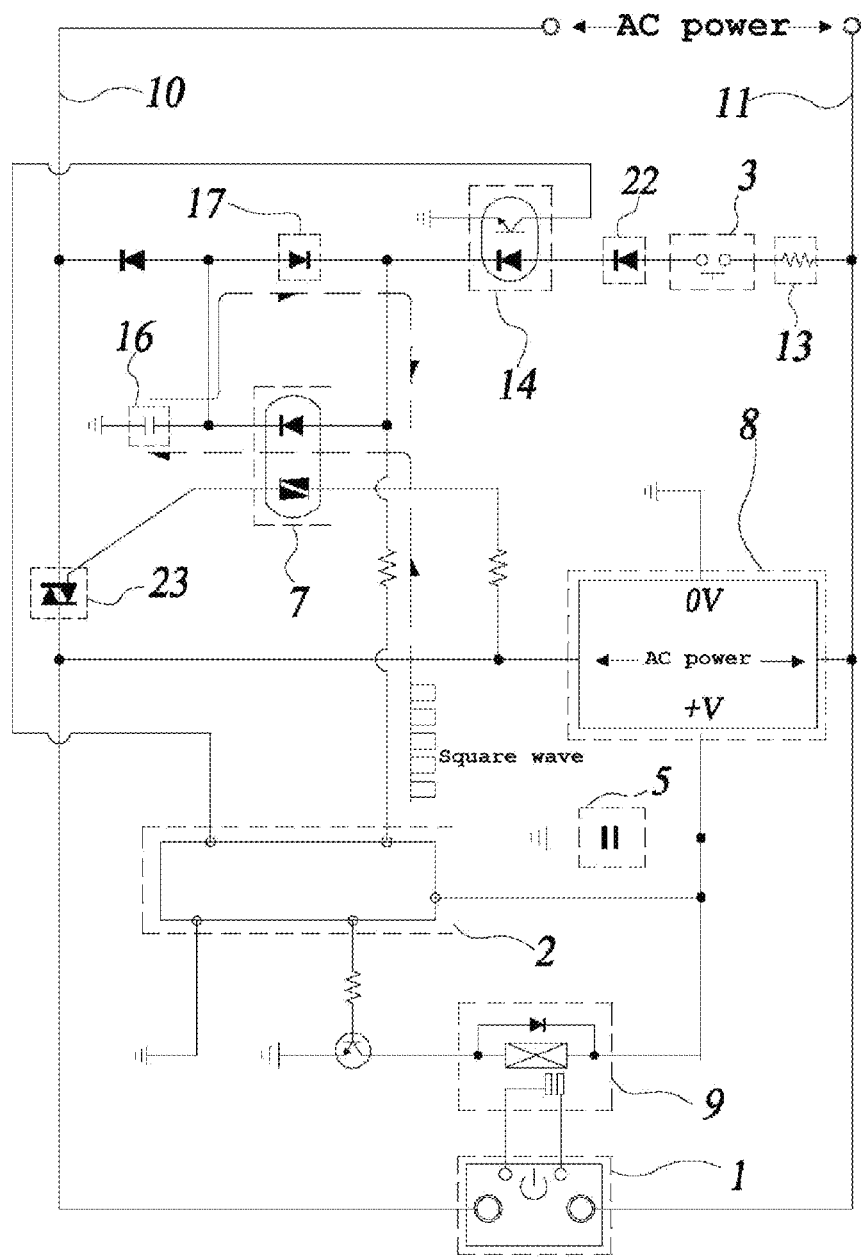
FIG. 2 is a circuit diagram showing current flows of a standby power cut-off device according to a second embodiment of the present invention.

Referring to FIGS. 1 and 2, the solid-state relay 7 according to the embodiment of the present invention supplies the commercial alternating current power to the low power supply unit 8 or cuts off the supply according to the operation of the manual switch 3, and as the microprocessor 2 transmits a high frequency, further, the solid-state relay 7 supplies the commercial alternating current power to the low power supply unit 8 or cuts off the supply.

Referring further to FIGS. 1 and 2, the solid-state relay 7 is operated according to the operation of the manual switch 3, and thus, the microprocessor 2 receives the power, and even if the operation of the manual switch 3 is stopped under the control of the microprocessor 2, there are method for allowing the microprocessor 2 to consistently receive the power. Two of the methods will be described below.

In the first embodiment of the present invention as shown in FIG. 1, first, the cut-off device 30 further includes a solid-state relay 21 controlled by the microprocessor 2 to allow the power to be consistently supplied to the microprocessor 2 even if the operation of the manual switch 3 is stopped after the manual switch 3 has been operated. The time required to allow the commercial alternating current power to be supplied to the low power supply unit 8 by means of the solid-state relay 7 according to the operation of the manual switch 3, the time required to allow the power to be supplied to the microprocessor 2 from the low power supply unit 8, and the time required to allow the current to flow to the solid-state relay 21 from the microprocessor 2 so that the power is consistently supplied to the microprocessor 2 are very short as if the above operations simultaneously occur, and even if the operation of the manual switch 3 is stopped, accordingly, the microprocessor 2 consistently receives the power. In this case, of course, the control signals are generated from the control signal generator 14. If the manual switch 3 is operated again, the microprocessor 2 does not transmit the current to the solid-state relay 21 by means of the control signal of the control signal generator 14, so that the commercial alternating current power, which is supplied to the low power supply unit 8, is cut off.

FIG. 2 shows a standby power cut-off device according to a second embodiment of the present invention, wherein instead of adding the solid-state relay 21 as suggested in the first embodiment of the present invention to allow the microprocessor 2 to consistently receive the power, a low-capacity capacitor 16 and a discharge enabler 17 are added to allow the microprocessor 2 to directly control the solid-state relay 7.

To allow the microprocessor 2 to consistently receive the power, even if the operation of the manual switch 3 is stopped after the manual switch 3 has been operated, the cut-off device 30 further includes the low-capacity capacitor 16 for passing a given high frequency generated from the microprocessor 2 when the given high frequency passes through the input side of the solid-state relay 7 and flows to the ground. Further, the cut-off device 30 includes the discharge enabler 17 for enabling the low-capacity capacitor 16 to be discharged.

Referring to FIG. 2, the microprocessor 2 generates the given high frequency. In this case, a waveform of the high frequency is desirably a square wave.

Further, the low-capacity capacitor 16 according to the embodiment of the present invention means a capacitor having a low capacity that passes a high frequency but does not pass commercial alternating current power.

Further, the discharge enabler 17 according to the embodiment of the present invention serves to open the path of the current so that upon the charge and discharge of the low-capacity capacitor 16, the discharge is easily performed. The discharge enabler 17 is a diode, and instead of the diode, a resistor may be adopted. In this case, a Schottky diode is desirably used as the diode.

In the second embodiment of the present invention as shown in FIG. 2, the standby power cut-off device 30 is configured to allow the given high frequency generated from the microprocessor 2 to pass the input side of the solid-state relay 7 and flow to the ground through the low-capacity capacitor 16 by means of the discharge enabler 17, so that the commercial alternating current power is supplied from the output side of the solid-state relay 7 to the low-power supply unit 8 to allow the microprocessor 2 to consistently receive the power.

The reason why the microprocessor 2 generates the given high frequency to allow the given high frequency to flow to the ground through the low-capacity capacitor 16 that does not pass the commercial alternating current power is because electrical collision between the operation voltage of the microprocessor 2 and the voltage of the commercial alternating current power is avoided when the solid-state relay 7 is controlled by the microprocessor 2.

Referring to FIG. 2, an explanation of the operation of the cut-off device 30 according to the flows of the current will be given in detail.

If the manual switch 3 is operated to allow the commercial alternating current power line 11 to be positive (+), the current flows to the resistor 13, the diode 22, a diode of the control signal generator 14, a diode of the solid-state relay 7, and the commercial alternating current power line 10. In this case, the control signal generator 14 is operated, and the low-power supply unit 8 is operated by means of the solid-state relay 7.

To allow the low power supply unit 8 to be operated by means of the microprocessor 2, the square wave of the given high frequency (e.g., with the range of tens of kHz) generated from the microprocessor 2 flows to the ground through the resistor, the diode of the solid-state relay 7, and the low-capacity capacitor 16. In this case, the discharge enabler 17 helps the square wave charged and discharged in and from the low-capacity capacitor 16 and flow to the ground, and the low power supply unit 8 is operated by means of the solid-state relay 7. As a result, even if the manual switch 3 is operated one time and is then not operated, the microprocessor 2 consistently receives the power from the low-power supply unit 8 under the control thereof. Further, if a triac 23 is located behind the solid-state relay 7, large current can flow, without having any main power switch 20. In the first embodiment of the present invention as shown in FIG. 1, furthermore, one triac 23 may be located behind the solid-state relay 7 and the solid-state relay 21 to flow large current.

Referring further to FIG. 1, the cut-off device 30 further includes the main power switch 20 adapted to allow the microprocessor 2 to supply the commercial alternating current power to the electrical device 1 or cut off the supply of the power. The main power switch 20 is a solid-state relay or relay that is controlled by the microprocessor 2. Otherwise, the main power switch 20 is coupled to the solid-state relay and one of a triac, a Field Effect Transistor (FET), an Insulated Gate Bipolar Transistor (IGBT), and a relay behind the solid-state relay. In this case, the relay includes a latching relay as well as a general-purpose relay.

Further, the cut-off switch 30 includes an on/off control switch 9 adapted to allow the microprocessor 2 to turn on and off the electrical device 1. The on/off control switch 9 connected to a switch of the electrical device 1 is a control switch for turning on and off the electrical device 1 after the commercial alternating current power has been connected to the electrical device 1, and a relay, a lead switch, or a transistor may be used as the control switch.

Further, the standby power cut-off device 30 includes a wireless receiver 4 for transmitting the signal detected outside to the microprocessor 2. The wireless receiver 4 is a sensor device (for sensing temperature, pressure, current, sound, color, light, hall, communication, etc.) and transmits, as an electrical signal, a signal detected according to an amount of variation to the microprocessor 2. The wireless receiver 4 may have a function of transmitting and receiving wireless signals.

Further, the wireless signals include wireless LAN signals transmitted to a wireless internet, infrared signals received from a remote controller, signals produced through short-range wireless communication technologies such as Bluetooth, NFC, Zigbee, and the like, and signals produced through wide-area wireless communication technologies such as LoRa, 3G, LTE, 4G, 5G, and the like, but they may not be limited thereto. According to the embodiment of the present invention, the wireless signals mean all wireless signals such as electric waves, light, sound waves, and the like that transmit information to a remote controlled area.

The cut-off device 30 further includes a voltage regulator 12 located behind the power storage unit 5 to supply a stable voltage to the wireless receiver 4.

To save the power supplied from the power storage unit 5, furthermore, the cut-off device 30 is configured to allow the wireless receiver 4 to be activated every a given period of time, not always. In this case, even if the wireless receiver 4 perform the detection every the given period of time (intermittently), continuous signals are transmitted through one-time control of a transmitting device (e.g., smartphone), but malfunctions do not occur.

To save the power supplied from the power storage unit 5, the microprocessor 2 is desirably in a sleep mode in a state of being in a standby mode after operated.

The cut-off device 30 further includes a voltage sensor 6 for sensing a charged voltage value of the power storage unit 5. The power storage unit 5 is controlled to be charged according to the charged voltage value sensed by the voltage sensor 6.

If the power storage unit 5 is a supercapacitor, a rated voltage must be higher than the supply voltage of the low power supply unit 8. If the rated voltage of the supercapacitor is lower than the supply voltage of the low power supply unit 8, the time for cutting off the commercial alternating current power is decreased disadvantageously. Further, a time constant means the time charged up to 62.8% of a power voltage to the supercapacitor. Generally, if time corresponding to five times of the time constant passes, the supercapacitor is charged to about 99% of the voltage in a normal state thereof. Moreover, if the time required to allow the charge of the supercapacitor to reach a predetermined reference lower charge value from a predetermined reference upper charge value is detected through experiments or the like, the supercapacitor is charged during a predetermined period of time according to the time required to allow the charge of the supercapacitor to reach the predetermined reference lower charge value from the predetermined reference upper charge value, without having any voltage sensor 6. As a predetermined period of time passes, therefore, the power storage unit 5 of the cut-off device 30 is controlled to be charged during the predetermined period of time.

The cut-off device 30 further includes an energy harvesting power unit 15 for charging the power storage unit 5. The energy harvesting power unit 15 includes, for example, solar cells and a diode that charge the power storage unit 5 with small amounts of energy from various sources.

The energy harvesting power unit 15 harvests amounts of energy from solar light, solar heat, electric light, wind (windmill), water (water turbine), and further, the energy harvesting power unit 15 harvests tiny amounts of energy from body motions or body temperatures and an amount of energy generated from a spiral spring.

Figure 5:
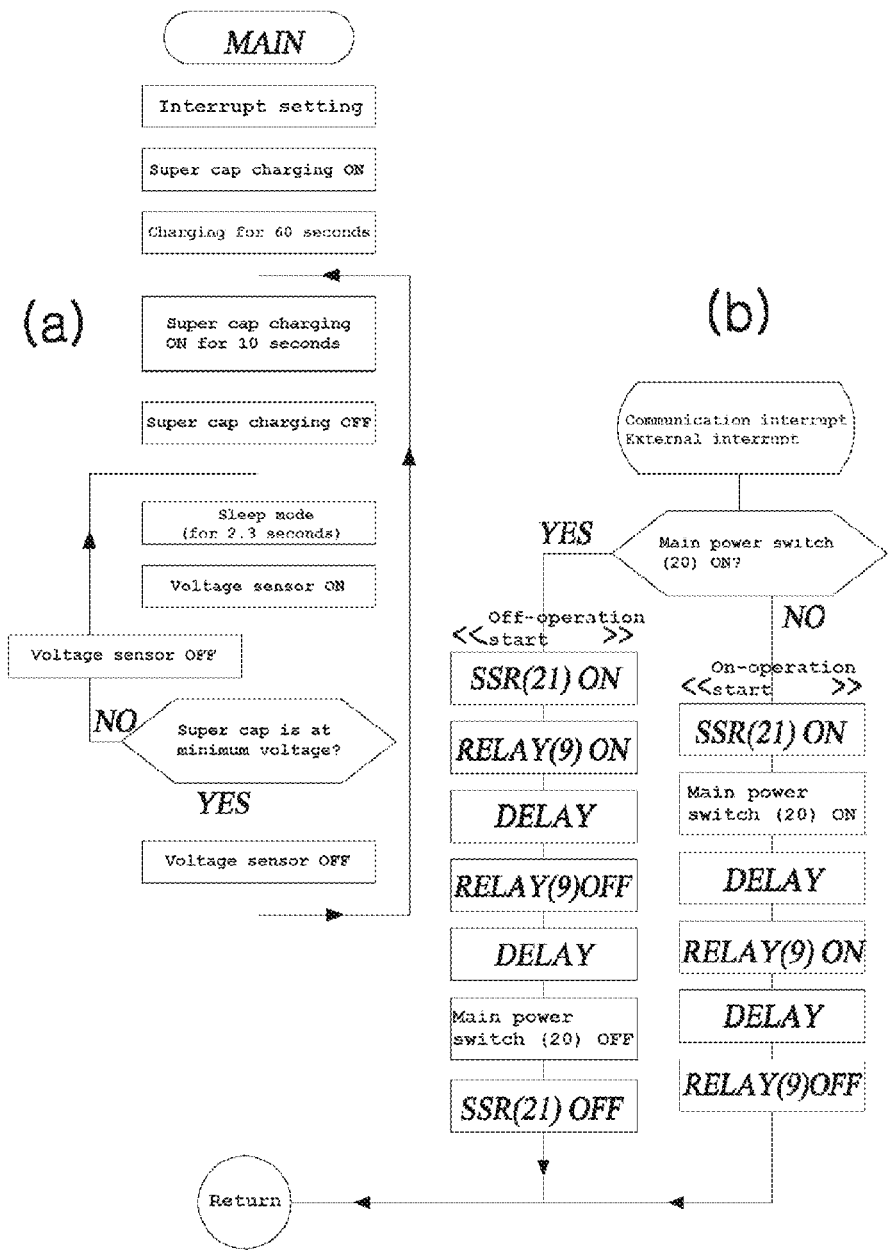
FIG. 5 is a flowchart showing on/off control of an electrical device such as an IoT device.

Referring to FIG. 5a, an example wherein the power storage unit 5 of the circuit diagram of FIG. 1 is a supercapacitor is suggested. The supercapacitor 5 is simply called super cap. As shown in FIG. 5a, an effective interrupt is set so that initially the supercapacitor 5 is sufficiently charged for the time (e.g., 60 seconds) corresponding to five times of the time constant and then charged for 10 seconds again, and next, the microprocessor 2 is in a sleep mode in the state of being in a standby mode. If 2.3 seconds pass in the sleep mode, the microprocessor 2 wakes up to operate the voltage sensor 6 so that the voltage sensor 6 detects whether the supercapacitor is at a predetermined minimum voltage. If the detected voltage is not the predetermined maximum voltage, the voltage sensor 6 is turned off, and the microprocessor 2 is in the sleep mode again. Next, if 2.3 seconds pass in the sleep mode, the microprocessor 2 operates the voltage sensor 6 to allow the voltage sensor 6 to detect whether the charged voltage value of the supercapacitor 5 is the value of the predetermined minimum voltage. If the detected voltage is lower than the predetermined maximum voltage, the voltage sensor 6 is turned off, the supercapacitor 5 is charged for 10 seconds, and the microprocessor 2 returns to the sleep mode again.

Referring to FIG. 1, a wireless signal interrupt and an external interrupt as shown in FIG. 5b will be explained. The microprocessor 2 determines the on/off states of the electrical device 1 that are generated by the signals of the wireless receiver 4 or the control signals of the control signal generator 14 generated by the manual switch 3 according to the operation of the main power switch 20. If the main power switch 20 is turned off to determine that the electrical device 1 is in an off state, an on operation is performed. First, the solid-state relay 21 is operated to charge the supercapacitor 5. Next, the main power switch 20 is operated (turned on) to supply the commercial alternating current power to the electrical device 1. After that, time is delayed until inrush current generated upon the supply of the power becomes normal current, and the electrical device 1 is turned on by means of the relay 9 as an on/off control switch connected to the power unit of the electrical device 1. Next, the relay 9 is turned off, and after a given period of time passes, a returning operation is performed. Further, the microprocessor 2 recognizes the on/off states of the electrical device 1 through the on/off states of the main power switch 20 by the signals of the wireless receiver 4 or the control signals of the control signal generator 14 generated by the manual switch 3. If the main power switch 20 is turned on to determine that the electrical device 1 is in an on state, an off operation is performed. First, the solid-state relay 21 is operated to charge the supercapacitor 5. Next, the electrical device 1 is turned off by means of the relay 9 connected to the power unit of the electrical device 1, and after a given period of time passes, the main power switch 20 and the solid-state relay 21 are turned off sequentially. After a given period of time passes, a returning operation is performed.

Although specific embodiments have been illustrated and described herein, it will be appreciated by those of ordinary skill in the art that any specific arrangement of software, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

INDUSTRIAL APPLICABILITY

According to the embodiments of the present invention, the standby power cut-off device is capable of determining that the operation of the manual switch is stopped, even while the plurality of control signals are generated by the operation of the manual switch, thereby preventing malfunctions from occurring due to the multi-operation control of the microprocessor, capable of completely cutting off the standby power if the electrical device is turned off, and capable of enabling internet of things devices to perform communication with each other with at least electrical energy, so that the standby power cut-off device is widely applicable to electrical devices.

The invention claimed is:

1. A standby power cut-off device installed on a power line connecting external commercial alternating current power and the inside of an electrical device, the standby power cut-off device comprising:
    a manual switch for supplying the commercial alternating current power or cutting off the supply;
    a solid-state relay for supplying the commercial alternating current power to an output side thereof if current flows to an input side thereof according to the operation of the manual switch;
    a low power supply unit for converting a voltage of the commercial alternating current power supplied by the solid-state relay and supplying the converted voltage;
    a microprocessor for receiving power from the low power supply unit and controlling operations of the standby power cut-off device;
    a power storage unit charged with the power received from the low power supply unit and supplying the power to the microprocessor; and
    a control signal generator for transmitting a control signal to the microprocessor if the current flows according to the operation of the manual switch,
    wherein the microprocessor controls the operations of the standby power cut-off device by using a control method comprising:
    a first step of repeatedly determining whether the control signal of the control signal generator exists or not if the manual switch is operated to allow the control signal to be generated from the control signal generator;
    a step of determining whether a given period of time passes after the first step has been performed; and
    a second step of determining whether the control signal exists, and
    if the given period of time passes after the first step has been performed, the microprocessor performs the second step, and if it is determined that the control signal exists in the second step, the microprocessor returns to the first step, whereas if it is determined that the control signal does not exist, the microprocessor finally determines that the operation of the manual switch is stopped.

2. The standby power cut-off device according to claim 1, further comprising a current-limiting resistor and a diode that are connected in series with the manual switch to reduce the current of the commercial alternating current power.

3. The standby power cut-off device according to claim 1, further comprising a solid-state relay controlled by the microprocessor to allow the power to be consistently supplied to the microprocessor even if the operation of the manual switch is stopped after the manual switch has been operated.

4. The standby power cut-off device according to claim 1, further comprising a low-capacity capacitor for passing a given high frequency generated from the microprocessor when the given high frequency passes through the input side of the solid-state relay and then flows to the ground, so that the microprocessor consistently receives the power even if the operation of the manual switch is stopped after the manual switch has been operated.

5. The standby power cut-off device according to claim 1, further comprising a wireless receiver for transmitting signals detected on the outside of the standby power cut-off device to the microprocessor.

6. The standby power cut-off device according to claim 1, further comprising a main power switch adapted to allow the microprocessor to supply the commercial alternating current power to the electrical device or cut off the supply of the power.

7. The standby power cut-off device according to claim 1, further comprising an on/off control switch adapted to allow the microprocessor to turn on and off the electrical device.

8. The standby power cut-off device according to claim 1, further comprising a voltage sensor for sensing a charged voltage value of the power storage unit.

9. The standby power cut-off device according to claim 1, further comprising an energy harvesting power unit for charging the power storage unit.

10. A standby power cut-off device installed on a power line connecting external commercial alternating current power and the inside of an electrical device, the standby power cut-off device comprising:
    a manual switch for supplying the commercial alternating current power or cutting off the supply;
    a solid-state relay for supplying the commercial alternating current power to an output side thereof if current flows to an input side thereof according to the operation of the manual switch;
    a low power supply unit for converting a voltage of the commercial alternating current power supplied by the solid-state relay and supplying the converted voltage;
    a microprocessor for receiving power from the low power supply unit and controlling operations of the standby power cut-off device;
    a power storage unit charged with the power received from the low power supply unit and supplying the power to the microprocessor; and
    a control signal generator for transmitting a control signal to the microprocessor if the current flows according to the operation of the manual switch,
    wherein the microprocessor controls the operations of the standby power cut-off device by using a control method comprising:
    a first step of repeatedly determining whether that the control signal of the control signal generator exists or not if the manual switch is operated to allow the control signal to be generated from the control signal generator;
    a step of determining whether a given period of time passes after the first step has been performed; and
    a second step of determining whether the control signal exists, and
    if the given period of time passes after the first step has been performed, the microprocessor performs the second step, and if it is determined that the control signal exists in the second step, the second step is performed whenever a predetermined period of time passes, whereas if the control signal does not exist, the microprocessor finally determines that the operation of the manual switch is stopped.

11. A standby power cut-off device installed on a power line connecting external commercial alternating current power and the inside of an electrical device, the standby power cut-off device comprising:
    a manual switch for supplying the commercial alternating current power or cutting off the supply;

a solid-state relay for supplying the commercial alternating current power to an output side thereof if current flows to an input side thereof according to the operation of the manual switch;

a low power supply unit for converting a voltage of the commercial alternating current power supplied by the solid-state relay and supplying the converted voltage;

a microprocessor for receiving power from the low power supply unit and controlling operations of the standby power cut-off device;

a power storage unit charged with the power received from the low power supply unit and supplying the power to the microprocessor; and a control signal generator for transmitting a control signal to the microprocessor if the current flows according to the operation of the manual switch, wherein the microprocessor controls the operations of the standby power cut-off device by using a control method comprising:

a first step of repeatedly determining whether that the control signal of the control signal generator exists or not if the manual switch is operated to allow the control signal to be generated from the control signal generator;

a step of determining whether a given period of time passes after the first step has been performed; and a second step of determining whether the control signal exists, and the microprocess repeatedly performs the second step during the given period of time after the first step has been performed, so that if the given period of time passes, without having the control signal, the microprocessor finally determines that the operation of the manual switch is stopped.

* * * * *